United States Patent [19]

Ito et al.

[11] Patent Number: 4,979,072
[45] Date of Patent: Dec. 18, 1990

[54] LAMP OUTPUT PROTECTIVE CIRCUIT IN ELECTRONIC CONTROLLER

[75] Inventors: Yasunobu Ito; Kunihiro Yamada; Akihiko Kubota, all of Aichi, Japan

[73] Assignee: Aisin AW Kabushiki Kaisha, Japan

[21] Appl. No.: 270,034

[22] Filed: Nov. 14, 1988

[30] Foreign Application Priority Data

Dec. 28, 1987 [JP] Japan .................... 62-329506

[51] Int. Cl.⁵ .............................. H02H 3/08
[52] U.S. Cl. ........................ 361/87; 361/57; 361/101; 361/93; 307/10.8; 315/77; 315/80
[58] Field of Search .............. 361/54, 56, 57, 87, 361/93, 100, 101; 307/10 R, 10 LS, 10.1, 10.8; 330/207 P, 29 Y; 215/77, 80, 84

[56] References Cited

U.S. PATENT DOCUMENTS

| | | | |
|---|---|---|---|
| 3,904,979 | 9/1975 | Suzuki | 330/207 |
| 4,394,703 | 7/1983 | Butcher | 361/101 |
| 4,396,882 | 8/1983 | Kellenbenz | 361/101 X |
| 4,581,551 | 4/1986 | Campbell, Jr. | 361/93 X |
| 4,589,049 | 5/1986 | Krumrein | 361/56 |
| 4,651,252 | 3/1987 | Babinski | 361/93 |
| 4,739,226 | 4/1988 | Murata | 307/10 L X |
| 4,771,357 | 9/1988 | Lorincz et al. | 361/93 X |

Primary Examiner—Derek S. Jennings
Attorney, Agent, or Firm—Lorusso & Loud

[57] ABSTRACT

A lamp output protective circuit for an electronic controller having a first npn transistor connected to an output terminal through which a lamp is supplied with electric power, a resistor connected between the emitter of said first npn transistor and the ground, and a second npn transistor having its collector connected to the base of the first npn transistor, its emitter to the ground and its base to a point between the emitter of the first npn transistor and the resistor. The base of the first npn transistor and the collector of the second npn transistor are connected to a signal line of the electronic controller connected to a power source. The base current of the first npn transistor is controlled with the second npn transistor and the resistor in order to cut off the flow of excess current in the first npn transistor in such a manner that the second npn transistor is turned on to bypass the base current of the first npn transistor when a certain voltage is applied to the base of the second npn transistor in response to the emitter current of the first npn transistor. The resistor can be made negligible compared with the lamp resistance, enabling the first npn transistor to be protected without reducing the illumination of the lamp.

2 Claims, 1 Drawing Sheet

LAMP OUTPUT PROTECTIVE CIRCUIT IN ELECTRONIC CONTROLLER

BACKGROUND OF THE INVENTION

This invention relates to a lamp output protective circuit for an electronic controller and, more particularly, to an overcurrent-protective circuit for a vehicle lamp output circuit.

In general, an electronic controller for automatic transmissions makes use of lamps to indicate a power mode, malfunctions, and the like. There are problems relating to such lamps as follows.

(1) In the case of a power mode display lamp, it is difficult for the driver to identify the power mode.

(2) In the case of a malfunction display lamp, the driver is liable to be unaware of a malfunction of the automatic transmission or the electronic controller.

A conventional technique in the field relating to these functions is known which will be described below.

FIG. 1 shows a conventional lamp output protective circuit for a lamp for the above kind of use.

This circuit is designed to constantly keep the thermal resistance of the filament of a lamp 1 large by allowing dark current to flow through a resistor 3, because in an initial stage of lighting of the lamp 1, the thermal resistance of the filament is small such that there is a possibility of destruction of a transistor 5. To protect the transistor 5 in the event of a short circuit of an output terminal 2, a resistor 4 is connected to the collector of the transistor 5.

A power supply of +5 V is connected to the base of the transistor 5 and to a signal line 7 of an electronic controller 8.

In this case, the resistor 3 has a resistance value of 560 $\Omega$, and a dark current of 17.6 mA flows, thereby maintaining the lamp with a large thermal resistance. The resistor 4 has a resistance value of 56 $\Omega$ whereby the maximum value of the collector current $I_C$ of the transistor 5 in the event of a short circuit between the output terminal 2 and a power supply of +12 V is limited to 214 mA.

In this conventional circuit, however, the effective resistance value of the resistor 4 is larger than a negligible value relative to the lamp resistance, and the illumination of the lamp is thereby reduced. There is also a problem of wasteful consumption of the battery energy due to the dark current flowing through the resistor 3. If the resistance of the lamp 1 during normal operation is 120 $\Omega$, the power consumption $P_L$ of the lamp is $$P_L \approx \{120/(50.9+120) \times 12\}^2 \times 1/120 = 0.592[W]$$

The combined resistance of the resistors 3 and 4 is $$R = 1/\{1/56 + 1/560\} = 50.9[\Omega]$$

and the power consumption of the lamp 1 is reduced to about ½ of the rating, resulting in a considerable reduction in the illumination.

SUMMARY OF THE INVENTION

In view of the above-described problems, it is an object of the present invention to provide a lamp output protective circuit which is adapted to a lamp lighting output circuit provided in an electronic controller and which is capable of protecting the output transistor against excess current caused at an initial lighting stage or in the event of a short circuit of the output terminal.

To attain this object, in accordance with the present invention, a first npn transistor provided as a first switching device is connected to an output terminal through which a lamp is supplied with electric power, and a resistor is connected between the emitter of the first npn transistor and the ground, and a second npn transistor is provided as a second switching device having its collector connected to the base of the first npn transistor, its emitter to the ground and its base to a point between the emitter of the first npn transistor and the resistor.

In this arrangement, the base current of the first npn transistor is controlled with the second npn transistor and the resistor in order to cut off the flow of excess current in the first npn transistor in such a manner that the second npn transistor is turned on to bypass the base current of the first npn transistor when a certain voltage is applied to the base of the second npn transistor in response to the emitter current of the first npn transistor. Therefore there is no need for a resistor such as the resistor 3 (refer to FIG. 1) that allows dark current to flow constantly as in the case of the conventional circuit. It is possible to select a resistance value of the resistor connected to the emitter of the first npn transistor which is small and negligible compared with that of the lamp, thereby enabling the first npn transistor to be protected without reducing the illumination of the lamp. Moreover, it is possible to avoid wasteful consumption of the battery energy such as that owing to dark current always flowing through the resistor 3 in the conventional circuit.

DESCRIPTION OF THE PREFERRED EMBODIMENT

An embodiment of the present invention will be described below with reference to the accompanying drawings.

Figure 2:
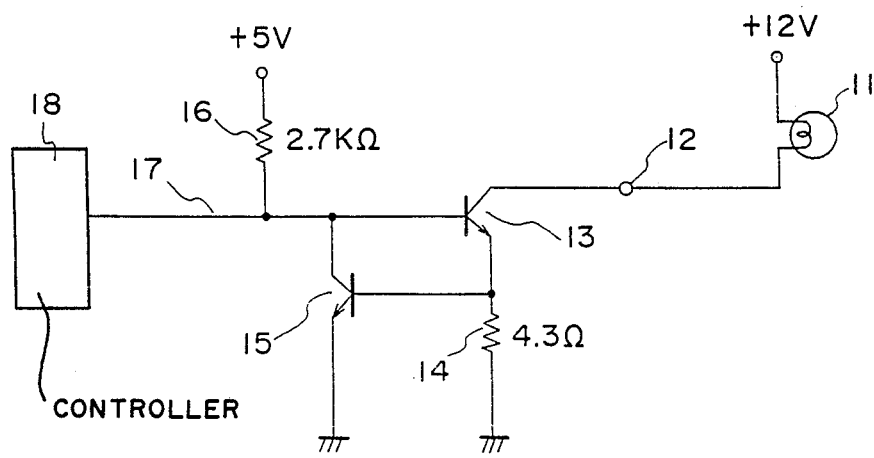
FIG. 2 is a diagram of a lamp output protective circuit which represents an embodiment of the present invention.

FIG. 2 is a diagram of a lamp output protective circuit which represents an embodiment of the present invention.

A lamp 11 which is provided in a vehicle is used to indicate a power mode or malfunctions, as described above, and is connected to an output terminal 12 to which the collector of a first non transistor 13 provided as a first switching device is connected. A resistor 14 (having a resistance value of, e.g., 4.3 $\Omega$) is connected between the emitter of the transistor 13 and the ground. A second npn transistor 15 is provided as a second switching device. The collector of the transistor 15 is connected to the base of the transistor 13, the base of the transistor 15 to the emitter of the transistor 13, and the emitter of the transistor 15 to the ground. A resistor 16 (having a resistance value of, e.g., 2.7 k$\Omega$) is connected at its one end to a power supply of 5 V and at its other end to the base of the transistor 13, to the collector of the transistor 15 and to a signal line 17 which is connected to an electronic controller 18.

A base voltage for the transistor 15 is produced across the resistor 14, thereby performing switching on/off control of the transistor 15. If the collector current of the transistor 13 becomes increased owing to an excess current or other causes, the transistor 15 is turned on when the base voltage thereof becomes 0.6. The base current of the transistor 13 is thereby bypassed so that the transistor 13 is turned off. The base voltage of the transistor 15 becomes 0.6 V when the collector current $I_c$ of the transistor 13 reaches a level of 140 mA. Therefore the collector current $I_c$ of the transistor 13 does not increase above this level, and the transistor 13 is thus protected securely. In this case, the collector current of the transistor 13 is calculated as $$I_C = 0.6/4.3 = 0.140 [A]$$

Figure 1:
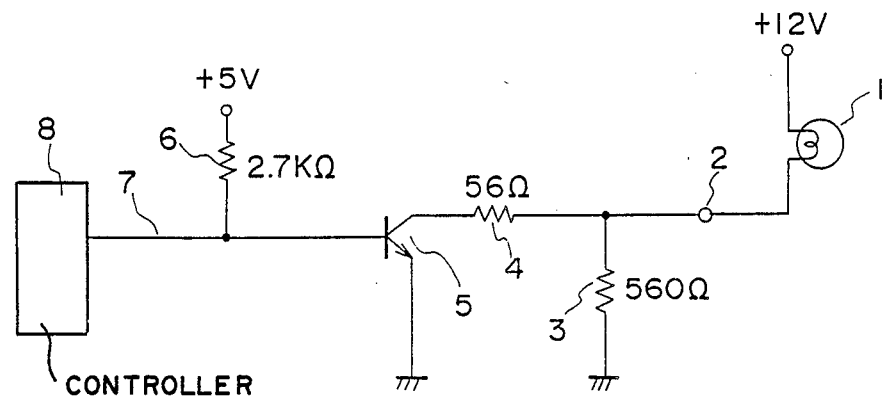
FIG. 1 is a diagram of a conventional lamp output protective circuit.

The protective function of the transistor 15 and the resistor 14 is also activated in a similar manner when an excess current flows in an initial lamp lighting stage or in the event of a short circuit. The need for resistors such as the resistors 3 and 4 used in the conventional lamp circuit (refer to FIG. 1) is thus eliminated.

If the resistance of the lamp is 120 Ω, the lamp power consumption $PL_{L2}$ during normal operation is $$P_{L2} = \{120/(4.3+120) \times 12\}^2 \times 1/120 = 1.12 [W]$$

As is apparent from this calculation, the reduction in the illumination of the lamp is small.

The present invention is not limited to the above-described embodiment; other various modifications based on the spirit of the present invention are possible and they are not excluded from the scope of the present invention.

What is claimed is:

1. A vehicle display lamp output circuit including a transistor protective circuit, comprising:
   (a) a first electric power source;
   (b) a lamp for display in a vehicle having an input terminal connected to said first electric power source;
   (c) a first npn transistor having its collector connected to an output terminal through which said lamp is supplied with electric power;
   (d) a low resistor connected between an emitter of said first npn transistor and the ground;
   (e) a second npn transistor having its collector connected to a base of said first non transistor, its emitter to the ground and its base to a point between said emitter of said first non transistor and said low resistor;
   (f) an electric controller connected to the collector of said second npn transistor;
   (g) a second electric power source connected to the collector of said second npn transistor; and
   (h) said second npn transistor and said resistor providing a current limiting circuit for protecting said first npn transistor against excess current; and wherein
   (i) said second npn transistor is turned on when excess current flows through said resistor to turn off said first npn transistor, and said second npn transistor is automatically turned off when the current flow in said resistor is reduced to allow said first non transistor to turn on.

2. A lamp output protective circuit for an electronic controller according to claim 1, wherein said resistor has a small resistance value in comparison with the resistance of said lamp.

* * * * *

UNITED STATES PATENT AND TRADEMARK OFFICE
CERTIFICATE OF CORRECTION

PATENT NO. : 4,979,072

DATED : December 18, 1990

INVENTOR(S) : ITO et al

It is certified that error appears in the above-identified patent and that said Letters Patent is hereby corrected as shown below:

IN THE SPECIFICATION:

Col. 2, line 53, "non" should read --npn--; and line 63, "5 V" should read --+5 V--.

IN THE CLAIMS:

Col. 4, line 13, "non" should read --npn--;

line 15, "non" should read --npn--; and line 29, "non" should read --npn--.

Signed and Sealed this

Twenty-eighth Day of July, 1992

*Attest:*

DOUGLAS B. COMER

*Attesting Officer*     *Acting Commissioner of Patents and Trademarks*